US012475216B2

(12) United States Patent
Pierre et al.

(10) Patent No.: US 12,475,216 B2
(45) Date of Patent: Nov. 18, 2025

(54) CLOUD SOLUTION FOR ROWHAMMER DETECTION

(71) Applicant: Dell Products, L.P., Round Rock, TX (US)

(72) Inventors: Jean Pierre, Brockton, MA (US); Azzam Tannous, Cambridge, MA (US); Jochen De Smet, Shrewsbury, MA (US); Ananthanarayanan Balachandran, Framingham, MA (US); Huijun Xie, Hopkinton, MA (US); Massarrah Tannous, Cambridge, MA (US)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 17/727,541

(22) Filed: Apr. 22, 2022

(65) Prior Publication Data

US 2023/0342454 A1    Oct. 26, 2023

(51) Int. Cl.
*G06F 21/55* (2013.01)
(52) U.S. Cl.
CPC .................. *G06F 21/554* (2013.01)
(58) Field of Classification Search
CPC ........................................ G06F 21/554
USPC ......................................... 726/23
See application file for complete search history.

(56) References Cited

U.S. PATENT DOCUMENTS

| | | | | |
|---|---|---|---|---|
| 10,073,966 B2* | 9/2018 | Oberg | | G06F 21/51 |
| 10,169,577 B1* | 1/2019 | Sobel | | G06F 3/0623 |
| 10,528,736 B1* | 1/2020 | Sobel | | G06F 12/1433 |
| 11,451,584 B2* | 9/2022 | Suominen | | H04L 63/1416 |
| 2008/0126779 A1* | 5/2008 | Smith | | G06F 21/575 |
| | | | | 713/2 |
| 2014/0373160 A1* | 12/2014 | Shigemoto | | G06F 21/577 |
| | | | | 726/25 |
| 2016/0330219 A1* | 11/2016 | Hasan | | H04L 63/20 |
| 2019/0087127 A1* | 3/2019 | Kim | | G06F 3/0659 |

(Continued)

OTHER PUBLICATIONS

Kim, Yoongu, et al. "Flipping Bits in Memory without Accessing Them: An Experimental Study of DRAM Disturbance Errors." 2014 ACM/IEEE 41st International Symposium on Computer Architecture (ISCA), 2014, https://doi.org/10.1109/isca.2014.6853210. 12 pages.

(Continued)

*Primary Examiner* — Taghi T Arani
*Assistant Examiner* — Pegah Barzegar
(74) *Attorney, Agent, or Firm* — Amin, Turocy & Watson, LLP

(57) ABSTRACT

A data service periodically monitors parameters of a computing system and periodically transmits metrics related to the monitored parameters to an AI service over a secure channel. The AI service uses a Time Series Classification model trained on training data that results from simulated row-hammer attacks to a computing system. The AI service processes the metrics using the trained Time Series Classification model. If the Time Series Classification model determines that the received metrics correspond to a row-hammer attack, the AI services transmits an attack confirmation message to the computing the data service. A remediation action is implemented responsive to receiving the attack confirmation message.

20 Claims, 11 Drawing Sheets

(56) References Cited

U.S. PATENT DOCUMENTS

| | | | | |
|---|---|---|---|---|
| 2020/0012600 | A1* | 1/2020 | Konoth | G06F 11/1068 |
| 2021/0264999 | A1* | 8/2021 | Bains | G11C 7/24 |
| 2021/0273968 | A1* | 9/2021 | Shaieb | G06F 8/65 |
| 2021/0334415 | A1* | 10/2021 | Yanamadala | G06F 21/552 |
| 2021/0406384 | A1* | 12/2021 | Jin | G11C 7/24 |
| 2022/0030009 | A1* | 1/2022 | Hasan | H04L 63/1491 |
| 2022/0253328 | A1* | 8/2022 | Barreto | G06F 9/45558 |
| 2022/0321540 | A1* | 10/2022 | Loman | H04L 63/0414 |
| 2023/0062582 | A1* | 3/2023 | Avadhanam | G06F 12/1458 |
| 2023/0095080 | A1* | 3/2023 | Yang | G06F 21/577 726/22 |
| 2023/0195889 | A1* | 6/2023 | Gurumurthi | G11C 11/40611 726/22 |
| 2023/0205872 | A1* | 6/2023 | Kotra | G06F 21/554 726/23 |
| 2023/0236735 | A1* | 7/2023 | Ayyapureddi | G11C 11/4078 714/47.2 |
| 2023/0236739 | A1* | 7/2023 | Gieske | G06F 3/0673 711/105 |
| 2023/0236982 | A1* | 7/2023 | Thirumala | G11C 11/4063 711/128 |
| 2023/0237152 | A1* | 7/2023 | Ayyapureddi | G06F 21/554 726/22 |
| 2023/0260565 | A1* | 8/2023 | Gieske | G11C 11/40622 365/185.04 |
| 2023/0273998 | A1* | 8/2023 | Polychronou | G06F 21/566 726/22 |
| 2023/0342454 | A1* | 10/2023 | Pierre | G06F 21/554 |
| 2023/0394140 | A1* | 12/2023 | Orlando | G06F 21/575 |
| 2023/0396410 | A1* | 12/2023 | Hamburg | H04L 9/0618 |

OTHER PUBLICATIONS

Unknown, and Ryan. "Project Zero" Search Results for Rowhammer, Mar. 9, 2015, [https://googleprojectzero.blogspot.com/search?q=rowhammer] retrieved Jun. 30, 2023, 24 pages.

Kwong, Andrew, et al. "Rambleed: Reading Bits in Memory without Accessing Them" 2020 IEEE Symposium on Security and Privacy (SP), 2020, https://doi.org/10.1109/sp40000.2020.00020. 17 pages.

Orosa, Lois, et al. "A Deeper Look into Rowhammer's Sensitivities: Experimental Analysis of Real DRAM Chips and Implications on Future Attacks and Defenses" MICRO-54: 54th Annual IEEE/ACM International Symposium on Microarchitecture, 2021, https://doi.org/10.1145/3466752.3480069. 17 pages.

Frigo, Pietro, et al. "Grand Pwning Unit: Accelerating Microarchitectural Attacks with the GPU" 2018 IEEE Symposium on Security and Privacy (SP), 2018, https://doi.org/10.1109/sp.2018.00022. 16 pages.

Gruss, Daniel, et al. "Rowhammer.js: A Remote Software-Induced Fault Attack in JavaScript" Detection of Intrusions and Malware, and Vulnerability Assessment, 2016, pp. 300-321., https://doi.org/10.1007/978-3-319-40667-1_15. 21 pages.

Smith, et al. "Expansion (E)-Port Spoofing Detection and Countermeasures" U.S. Appl. No. 17/697,793, filed Mar. 17, 2022, 36 pages.

Pierre, et al. "Cloud-Based Boot Integrity" U.S. Appl. No. 17/577,420, filed Jan. 18, 2022, 28 pages.

Fontes, et al. "Cloud-Based Secured Component Verification System and Method" U.S. Appl. No. 17/814,081, filed Jul. 21, 2022, 32 pages.

* cited by examiner

CLOUD SOLUTION FOR ROWHAMMER DETECTION

BACKGROUND

Row-hammer is a type of attack on computer memory that exploits a weakness in dynamic random access memory ("DRAM") devices to cause bit flips in the memory. The underpinning technique for the attack is to read aggressively (e.g., read with high frequency) from the same row in memory causing bitflips in the adjacent row in memory due to voltage changes, or changes in electron charge, in a row being read. FIG. 1 illustrates how a high access count on the aggressor row causes bit flips on the victim row. A common usage for the row-hammer attack is to cause Kernel privilege escalation by causing one or more bits to flip in a page table entry (PTE). In a laboratory setting, row-hammer attacks have been able to successfully extract an RSA-2048 key from a root level secure shell (SSH) daemon.

The effects of, or success of, row-hammer attacks worsen as cell size or spacing of computing device memory shrinks. Row-hammer attacks evolve and currently are targeting mobile devices' memories using graphics processing units (GPUs), or may use script code, such as JavaScript code, to execute row-hammer attacks.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

The United States National Institute of Standards and Technology ("NIST") has put forth a cybersecurity framework having a five-function core. The five functions comprise: (1) Identify; (2) Protect; (3) Detect; (4) Respond; and (5) Recover. Embodiments disclosed herein relate at least to the third function 'Detect' and may relate to other functions, including the fourth function 'Respond.'

Embodiment discussed herein may be implemented with a cloud-based software application, such as Cloud IQ as marketed by Dell, Inc., that may provide a computer service, that may use predictive analytics and machine learning to facilitate an enterprise monitor in monitoring its IT assets and infrastructure, and that compare metrics to determined criteria.

In an embodiment, a method may comprise generating, by a system comprising a processor, metrics associated with a computing system, or systems other than the system. A data service may be a component of the computer system that monitors the metrics or parameters corresponding thereto. The method embodiment may comprise transmitting, via a network, the metrics to an artificial intelligence (AI) service. The AI service may be a cloud service that is located remotely, geographically or logically, from the computer system where the metric or parameters are monitored. The method may comprise receiving, from the AI service via the network, an attack confirmation message that a memory of a computing system of the computing systems has been subjected to a row-hammer attack, wherein the attack confirmation message was generated based on a determination that the metrics correspond to a row-hammer attack; and responsive to the attack confirmation message, initiating a remediation action with respect to the row-hammer attack to reduce an effect of the row-hammer attack at the computing system. The metrics may comprise at least one of a cache-miss count, a processor instruction per cycle count, a co-processor instruction per cycle, or a cache flush count. In an embodiment, the system comprising the processor may be associated with, or part of, the system or systems with which the metrics correspond to.

The AI service may comprise a time series classification model. The time series classification model may be trained using labeled data that represents, based on previous human prediction data, at least one effect to a processor or to the memory of the computing system, which the metrics relate to, that is likely to result from a row-hammer attack.

The attack confirmation message comprises an instruction to initiate the remediation action. In an embodiment, the system that corresponds to the collection of the metrics may determine the remediation action applicable to the initiating of the remediation action. In an embodiment, the AI service may determine that the memory of the computing system has been subjected to a row-hammer attack based on a type of computing system.

A remediation action may comprise at least one of: a stopping of data replication to secondary storage of the computing system, a disabling of a connection by the computing system to a host, enabling a service mode that allows service account access only by the computing system, enabling a diagnostic service for the computing system, enabling a data collection service for the computing system, shutting down a file system service of the computing system, shutting down a block storage service of the computing system, protecting a management database of the computing system, or restricting management connectivity by the computing system to a storage platform. In an embodiment, a remediation message notifying of performance of the remediation action may be transmitted to the AI service.

In an exemplary embodiment, a first computing system may comprise a processor configured to: generate system data metrics; transmit the system data metrics to an artificial intelligence (AI) service (which may be a cloud-based service) via a network; receive an attack confirmation message via the network from the AI service that a memory of a second computing system has been subjected to a row-hammer attack, wherein the attack confirmation message is based on a determination that metrics of the system data metrics associated with the second computing system correspond to the row-hammer attack; and responsive to the attack confirmation message, perform a remediation action for the second computing system with respect to the row-hammer attack. In an embodiment, the first computing system and the second computing system may be part of an enterprise network, or part of another network, and may not need to communicate with one another via a different network. The first and second computing systems may be part of a computing network, which may comprise the data service, that communicates with another computing network, which may comprise the AI service, via a communication network, which communication network may comprise the Internet.

The system data metrics may comprise at least one of a cache-miss count or a central processing unit instruction per cycle count. The processor of the first computing system may be further configured to determine the remediation action. In an embodiment, the attack confirmation message comprises an instruction to perform the remediation action.

A remediation action comprises at least one of: stop data replication to secondary storage, disable connection to a host, enable a service mode that allows service account access only, enable a diagnostic service, enable a data collection service, shut down a file system service, shut down a block storage service, protect a management database, or restrict management connectivity to a storage platform.

In yet another exemplary embodiment, a method may comprise receiving, by a first computing system comprising a processor, system data metrics from a second computing system; analyzing the system data metrics using an artificial intelligence (AI) model; based on a result of the analyzing of the system data metrics, determining, using the AI model, that the system data metrics correspond to a row-hammer attack of a memory of the second computing system; and transmitting an attack confirmation message to the computing device notifying the second computing system of the row-hammer attack. The AI model may comprise a time series classification model. The system data metrics may comprise at least one of a cache-miss count, a processor instruction per cycle count, a co-processor instruction per cycle count, or a cache flush count. The AI model is trained with labeled data corresponding to at least some of the system data metrics. The labeled data may comprise data that is acquired during sequential predetermined periods. The AI model may be implemented in a cloud-based platform that communicates with the second computing system via a secure remote support-based secure channel. The exemplary embodiment method may further comprise computing at least one risk-level metric based on the determining that that the system data metrics correspond to the row-hammer attack; and sending the at least one risk-level metric to a user interface to be rendered via the user interface.

DETAILED DESCRIPTION OF THE DRAWINGS

Figure 1:
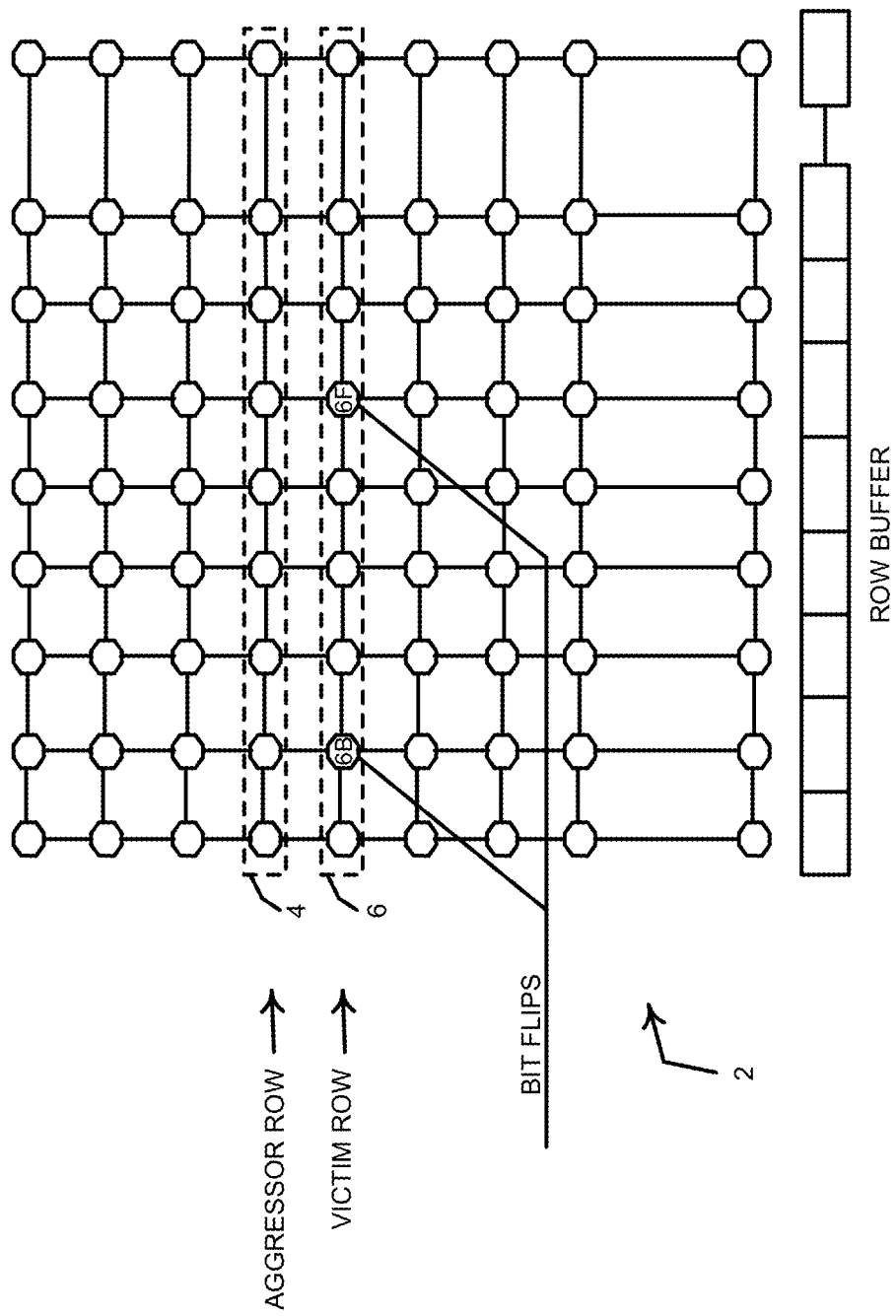
FIG. 1 illustrates a schematic of a memory experiencing a row-hammer attack.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

One or more embodiments of the present application minimize firmware or software package updates transmitted to servers remote from a central location from which one or more update packages are distributed.

Turning now to the figures, FIG. 1 illustrates a graphical representation of a grid of memory cells of a memory 2, which memory may be a dynamic random access memory ("DRAM") or which cells may be flip-flops, transistor-capacitor combination, or other mechanisms for storing digital data in a computer memory. In a row-hammer attack, bits stored in cells of aggressor row 4 may be read at a rapid rate. Such rapid reading of row 4 may induce changes in bits of victim row 6 due to charge (e.g., electrons) stored in the cells of the victim row depleting with time. As charge stored in cells of victim row 6 drop before a refresh cycle, rapid reading in adjacent cells to the victim row may cause an electric field that bleeds to the neighboring row of cells and may cause some to change state, or 'flip' (i.e., change digitally from a 0 to a 1, or from a 1 to a 0). The figure shows cells 6B and 6F being flipped due to a rapid-read row-hammer attack on aggressor row 4.

To successfully perform a row-hammer attack, an attacker aggressively reads the same memory row, such as row 4, and the attacker must overcome a problem presented by a central processing unit's (CPU's) cache. After a CPU accesses a memory location, data in and accessed from the memory location may be replicated and stored in a cache of the CPU, for example L2 cache or L3 cache. Subsequent CPU read operations of the data from the memory location are typically served from the CPU cache and not from the memory location in DRAM. To overcome this problem a Row-hammer attacker clears the CPU cache between read operations, which may be requested in the row-hammer attack. The row-hammer attack may comprise malicious code that is being run by a CPU that is in communication with the memory location being attacked, for example, rows of memory cell array 2.

Figure 2:
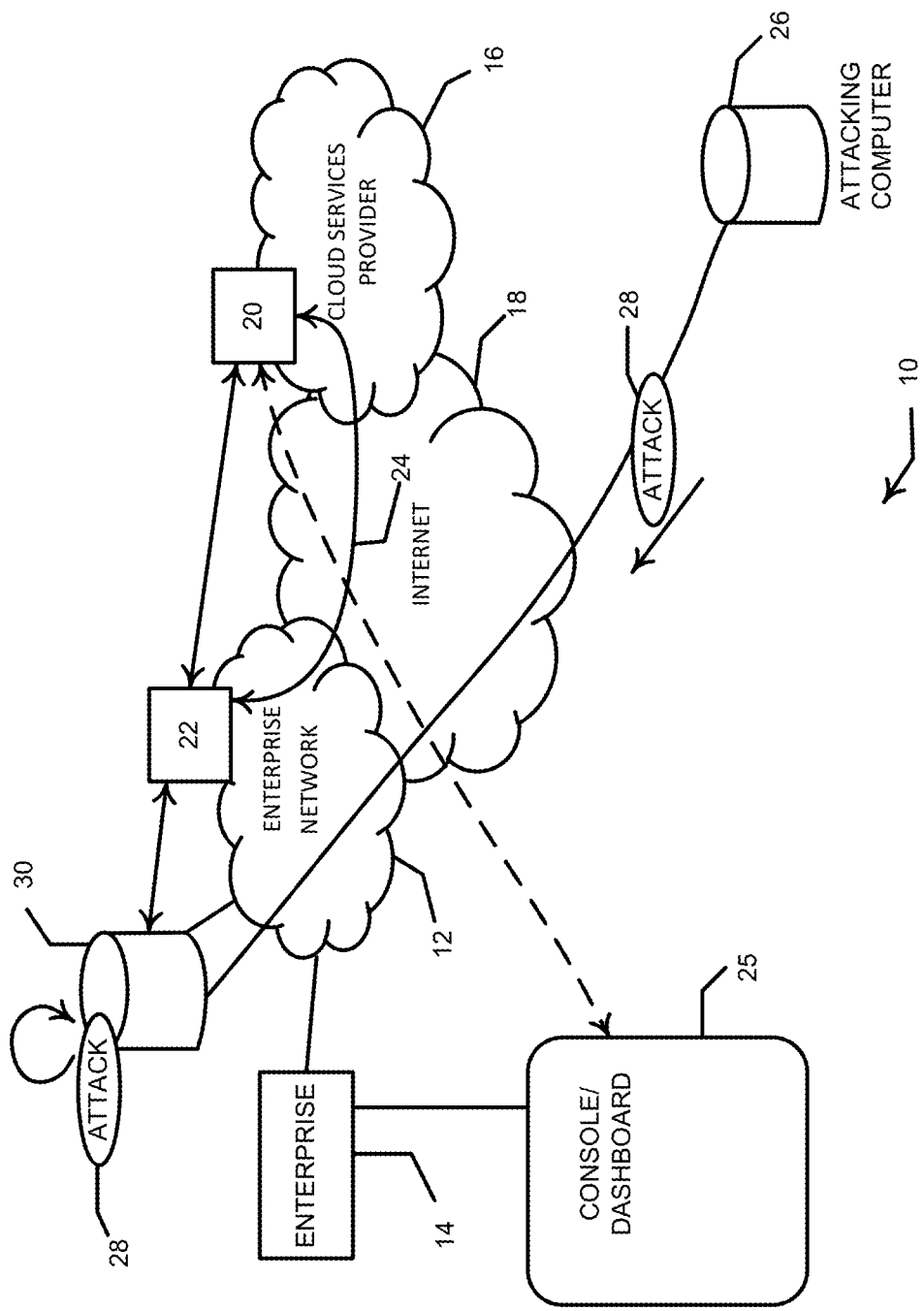
FIG. 2 illustrates a row-hammer detection system in a cloud environment.

Turning now to FIG. 2, the figure illustrates a computing and networking environment 10. Environment 10 may include an enterprise network 12 operated by, or for, an enterprise 14. Computing systems and devices of enterprise network 12 may obtain cloud services from a cloud services provider 16, which may provide cloud computing and networking services to computing devices and systems of enterprise network 12. In an embodiment, enterprise network 12 may communicate with cloud services provider via a public communications network 18, such as, for example, the Internet. In another embodiment, cloud services provider 16 may provide platforms that provide cloud services but that are run from one or more computing devices of enterprise network 12.

Cloud services provider may provide an artificial intelligence ("AI") platform 20 that may provide monitoring and analytical services to computing devices and systems of enterprise network 12. AI platform 20 may communicate with a data services platform that may be part of enterprise network 12 or may be operated for enterprise 14 and its network devices and systems. Data services 22 may comprise one or more applications running on one or more computing devices or systems of enterprise network 12 that may monitor parameters related to behaviors, activity, actions, states, or parameters related to other computing device or computing devices of the enterprise network that might be beneficial to, or specified by, enterprise 14 or an operator of the enterprise network. Data services 22 may determine metrics that correspond to the monitored parameters corresponding to computing devices and systems that may be part of the enterprise network 12. Data services 22 may communicate determined metrics to AI platform 20 via secured communication link 24, which may comprise a secure remote support (SRS) secure channel, for example, an EMC SRS (ESRS) secure channel. Cloud services provider 16 may provide information to a user interface 25, which may be referred to as a console, or a dashboard, that facilitates personnel of enterprise 14 in staying abreast of the state of computing devices and systems of enterprise network 12.

An attacker may use attack computing device 26 to send an attack 28, which may comprise a row-hammer attack or instructions to cause a row-hammer attack, to a victim computing device 30 of enterprise network 12 via public network 18. Attack computing device 26 may be a personal computer, a laptop, a desktop, a smartphone, a tablet, or the like. Attack computing device 26 may comprise a server computing device. Attack computing device 26 may send attack 28 upon manual instruction from an attacker/user using the attack computing device, or the attack computing device may automatically send an attack.

Attack 28 may comprise a single instruction to read a memory, such that each time a memory is read a separate attack message 28 may need to be sent from attack computing device 26. In an embodiment, attack 28 may comprise computer code that may evade security measures and automatically install on a processor of the victim computing device. Attack 28 may cause a processor of victim computing device 30 to repeatedly read a victim row in a memory of a memory in communication with a processor of the victim computing device. The memory being attacked by attack 28 may be a memory of victim computing device 30 or may be a memory that is part of a different computing device or system of enterprise network 12. Attack 28 may include instructions to clear, or flush, a memory (i.e., a cache) of a CPU of victim computer 30 before a read instruction is performed of a target memory.

Data service 22 may monitor one or more parameters and generate metrics that correspond to the parameters. Examples of parameters that data service 22 may monitor and produce metrics corresponding thereto may include: a cache-miss count (may be referred to as a cache read-miss count), a CPU instruction per cycle count, or a cache flush/clear count. These are metrics that may be associated with actions that a row-hammer attack may cause a computing device that is under attack to perform. A cache read miss occurs when a CPU attempts to read data from a cache of the CPU instead of reading from a location in a memory, such as a DRAM, that is in communication with the CPU and the data expected by the CPU not in the cache. Typically, a CPU will attempt to read from a L1 cache first, then from an L2 cache, and then from an L3 cache, and so one if the CPU has access to more cache levels. Data service 22 may monitor cache read misses and generate a count of read misses for a cache during a determined period, for example, one second. Data service 22 may publish a count of cache misses during the determined period according to a determined frequency, such as, for example, every five minutes. Data service 22 may monitor a number of instructions a CPU executes and may determine an Instructions Per Cycle ("IPC") based thereon. Thus, one or more cache read-miss count metrics that corresponds to one or more CPU caches, as well as an IPC metric may be determined by data service 22 and communicated to AI platform 20.

AI platform may process metrics received from data service 22 via secure link 24 and determine that one or more memory devices, such as DRAM devices, of one or more computing devices of enterprise network 12 may have been attacked by a row-hammer attack. Cloud services provider may provide information that corresponds to the row-hammer attack to management console/dashboard 25 for display thereon. If AI platform 20 determines that a computing device, or system, of enterprise network 12 has been attacked by a row-hammer attack, the AI platform may provide an attack confirmation message via secure link 24 to data service 22. The attack confirmation message may identify a CPU, memory, or other computing device or system of enterprise network 12, that has been attacked by a row-hammer attack. The attack confirmation message may merely indicate that a row-hammer attack occurred, or the attack confirmation message may provide instructions for one or more remediation actions to take. Responsive to the attack confirmation message, data service 22 may implement, or cause to be implemented, remediation actions. Remediation actions may include: stop data replication to secondary storage; disable connection to a host; enable a service mode that allows service account access only; enable a diagnostic service; enable a data collection service; shut down a file system service ("NAS"); shut down a block storage service ("SAN"); protect a management database; or restrict management connectivity to a storage platform.

Figure 3:
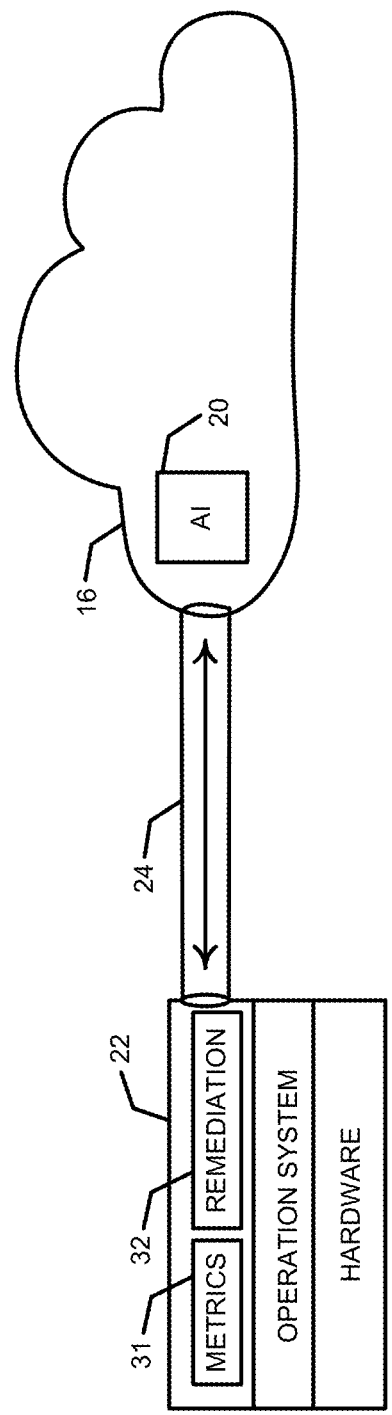
FIG. 3 illustrates a flow diagram of a row-hammer detection service facilitation method.

Turning now to FIG. 3, the figure shows data service 22 coupled via secure link 24 to AI platform 20 of cloud services provider 16. Data service 22 may comprise a metrics collector service 31 and an attack remediation service 32, which may be a service running in the background. An example of a cloud AI platform services provider 16 may be Cloud IQ services provided by Dell, Inc. Metrics collector service 31 may comprise a lightweight agent that collects CPU Metrics info, such as, for example: L2 cache miss count, L3 cache miss count, IPC count, or a cache flush count. In an embodiment, the metrics may be collected every second and published in bulk every 5 minutes to cloud AI service 20. It will be appreciated that other determined periods of collection and publishing may be selected.

Attack remediation service 32 may comprise shutting down data services, including data services 22, when a determination is made that a computing system may have been tampered with, such as having been subjected to a row-hammer attack. Attack remediation service 32 may be the last standing service relaying the state of a computing system to cloud services provider 16. The integrity of attack remediation service 32 may be facilitated by using, for example, a Linux Kernel's Integrity Measurement Architecture ("IMA"). Attack remediation service 32 may determine remediation action to take based on a number of attack attempts criteria. Attack remediation service may determine remediation action to take based on a time period during which an attack likely occurred.

Secure channel 24, for example, an SRS or an ESRS, may provide an added layer security that stems from client registration and provides security above and beyond that provided by https security and the transport layer security (TLS) encryption.

Cloud services of cloud services provider 16 may perform a Time-Series Labeling Service with AI platform 20 and may label data received from data services 22 as part of detection of whether a Row-hammer attack may be occurring or whether incoming data corresponds to normal operation of a computing system being monitored and may use a pre-trained model as described in more detail in reference to FIG. 4 below. When a computing system is determined to be compromised based on data received from data service 22, the labeling service may cause isolation of the compromised computing system to reduce the 'blast surface', or range/scope (e.g., reduce effect to other computing devices or systems), of the attack. Minimizing the range, or scope, of the effects of a row-hammer attack may be facilitated by communicating a series of protective measures to Attack Remediation Service 32.

Figure 5:
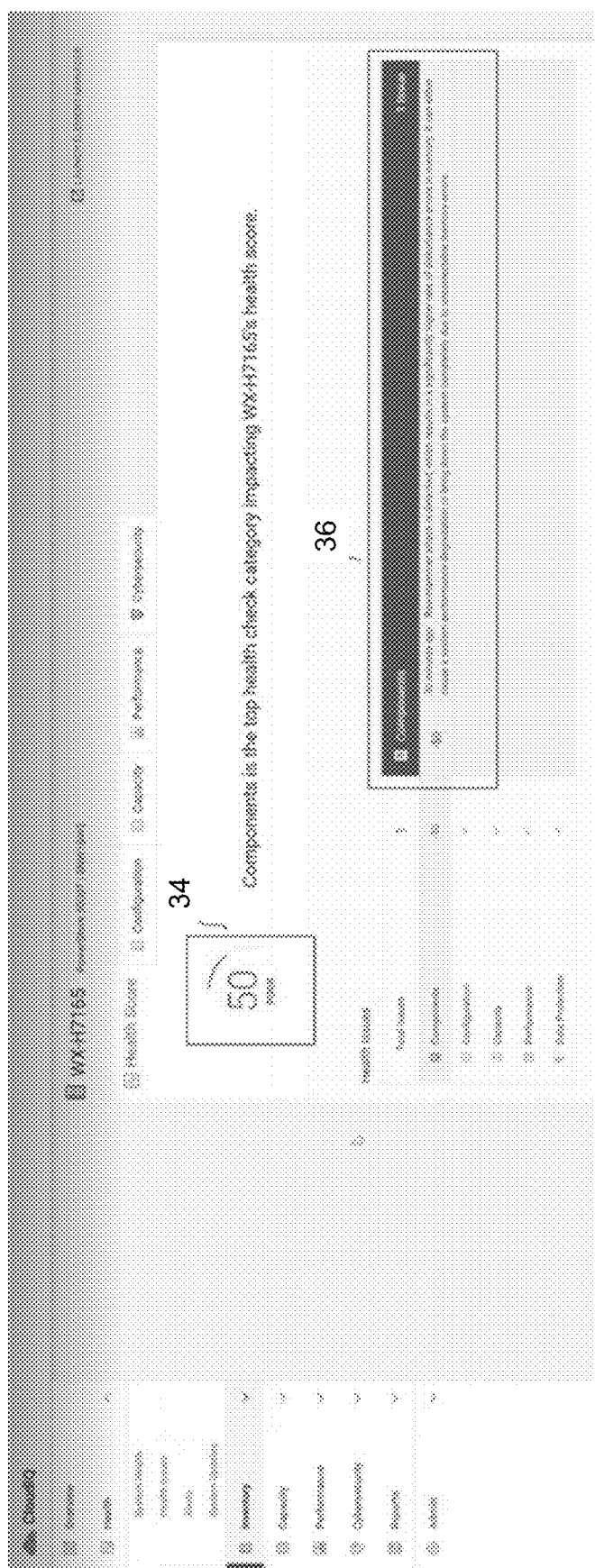
FIG. 5. Illustrates a user interface displaying a computer system degradation score.

Cloud services of cloud services provide 16 may facilitate a presentation layer relative to a row-hammer attack. For example, a computing system's health score 34 may be provided to a user interface shown in FIG. 5 that may be usable by an enterprises information technology ("IT") personnel. The cloud services may degrade, or lower, a health score 32 of a computing system that has been attacked responsive to detection of a row-hammer attack and may display system health issue(s) 36 due to the attack.

Figure 6:
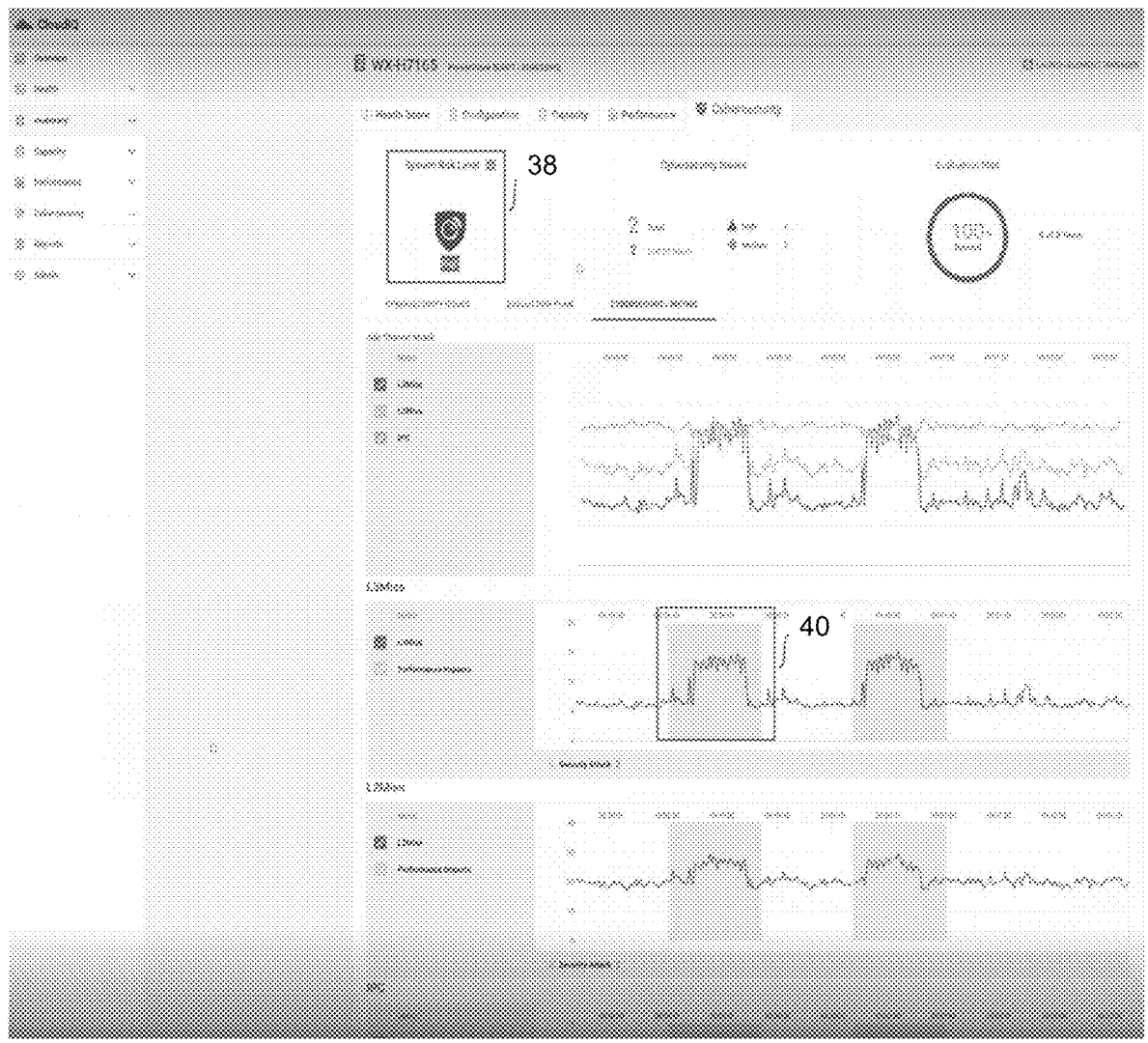
FIG. 6 illustrates a graphic representation of system data metrics.

In FIG. 6, a user interface is shown displaying different collected metrics and overlays the chart with a shaded band for a period during which AI service 20, which may be running Time-Series Labeling Service algorithm, detected a Security attack. The attacked system's system Risk Level 38 may be listed as High. L2 cache miss count, L3 cache miss count, and IPC count metrics 40 displayed graphically during an attack period. A cache flush count metric may be displayed.

Figure 4:
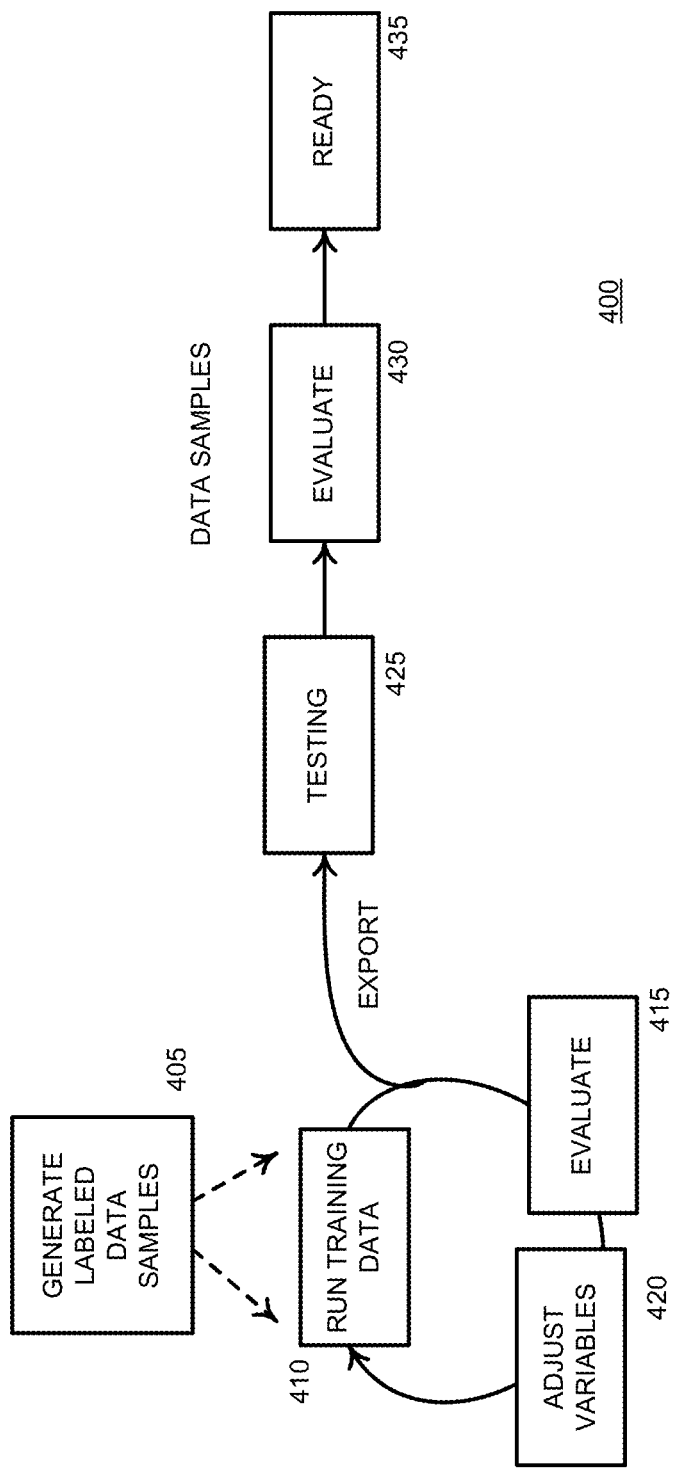
FIG. 4 illustrates a flow diagram of a row-hammer detection service implementation.

Turning now to FIG. 4, the figure illustrates a flow diagram of a method 400 for training an AI platform, such as AI platform 20, which method may be part of an AI model training and evaluation implementation. At step 405, sample data may be obtained by purposefully causing a computer system of enterprise system 12 to simulate a row hammer attack. It will be appreciated that the obtaining of training data may be performed by a computing system that is not part of enterprise network 12. Computer code may be executed by a CPU having a processor to cause the simulation of a row-hammer attack during a row-hammer attack simulation session. Metrics, such as L2 and L3 cache read miss counts as well as IPC counts may be obtained during the simulation session at step 405 to generate training data.

At step 425, testing may comprise training one or more different AI models with the training data subsets and then testing the trained model with the test data subsets. Data service 22 facilitates monitoring and providing of a time series representation of metrics, such as, for example, a number of L2 cache read misses, a number of L3 cache read misses, and IPC counts. AI models chosen for training and for selection for use by AI platform 20 may comprise Time Series Classification ("TSC") AI models.

An objective in a TSC task is to identify a time series as coming from one of a plurality of sources or predefined groups, using labeled training data. This may be considered supervised learning, where different time series sources are considered known. A TSC approach is to use a nearest neighbor ("NN") classifier coupled with a distance function. For example, a dynamic time warping (DTW) distance when used with a NN classifier may be used as a baseline for benchmarking.

As examples that are not meant to be limiting, three categories of time series classification using specific algorithms are described that may be used in a model by AI platform 20.

Distance-Based Classification.

Distance metrics may be used to determine class membership. Algorithms that may be used comprise K-Nearest Neighbors (with Dynamic Time Warping) for Time Series. The k-nearest neighbors ("KNN") algorithm can be adapted for time series by replacing a Euclidean distance metric with a dynamic time warping (DTW) metric. DTW measures similarity between two sequences that may not align exactly in time, speed, or length. KNN with DTW may consume a large amount of space and time resources when computing an output. During classification, the KNN-DTW may compare each object with all the other objects in a training set. KNN may not provide information regarding why a series was assigned to a certain class.

Interval-based Classifiers.

Interval-based classifiers may base classification on information contained in various intervals of a series. An example of an algorithm that may be used is Time Series Forest Classifier. A time series forest (TSF) classifier adapts the random forest classifier to series data. Then, the algorithm may (1) Split the series into random intervals, with random start positions and random lengths; (2) Extract summary features (mean, standard deviation, and slope) from each interval into a single feature vector; (3) Train a decision tree on the extracted features. 1-3 may be repeated until determined number of trees have been built or until a determined period expires. Another example of an Interval-based algorithm may comprise using Gini impurity instead of information gain for the classification criteria.

Frequency-Based.

Frequency-based classifiers typically use frequency data extracted from a series. An example algorithm may comprise Random Interval Spectral Ensemble ("RISE"), which is a variant of time series forest. RISE differs from time series forest in two ways: (1) RISE may use a single time series interval per tree, and (2) RISE may be trained using spectral features extracted from the series, instead of using summary statistics. A RISE algorithm may comprise: (1) Select random interval of a series; (2) For the same interval on each series, apply the series-to-series feature extraction transformers. (Autoregressive coefficients, autocorrelation coefficients, and power spectrum coefficients); (3) Form a new training set by concatenating the extracted features; (4) Train a decision tree classifier; and (5) repeat 1-4 until the required number of trees have been built or time runs out.

Given a set of time series with class labels, different models may be trained to predict the class incoming time series data from the platform to varying degrees of accuracy.

In an example training session 405, data with one second of data collected for L3 cache misses, for L2 cache misses, and for IPC count may be obtained. Metrics for fifty-three different attack patterns may be collected for two-minute periods and metrics for twenty-five attack patterns may be collected for five minutes. In addition, three normal data patterns with no attacks may be collected for a six-hour period and for two different thirty-minute periods. For such a sample training data set, the dataset may include patterns that result from simulated row-hammer activity both with and without regular input/output ("I/O") loading to a storage system or memory during an attack and during operation when an attack is not occurring. In the example, before training, fifty-three random two-minute intervals may be selected from the three normal data patterns to create a total of 106 samples and twenty-five random five-minutes intervals may be selected from the three normal data patterns to create a total of fifty samples. Obtaining training data during a session conducted at step 405 may comprise: running code to simulate a row-hammer attack at step 410; evaluating output of running the code to determine effectiveness of running the session code during step 405 at simulating a row-hammer attack by evaluating characteristics, such as voltages, and states, such as digital '1' or '0', in cells of a victim row of a memory at step 415, and revising at step 420 variables of the code simulating the attack to increase effectiveness at row-hammer simulation. In the example, after obtaining data output that exhibits satisfactorily effectiveness at simulating a row-hammer attack, 116 samples, or training data subsets, may be used for training a model of AI platform 20 and forty test data subsets may be used for testing at step 425.

In an embodiment, training and testing of different algorithms for use in a model of AI platform 20 may comprise the following results: KNeighbors Time Series Classifier score: 1.000; Time Series Forest Classifier score: 1.000; Custom Time Series Tree Based Classifier score: 0.923; and Random Interval Spectral Ensemble Forest Classifier score: 0.923.

Of the previously listed examples, KNeighbors performs very well but as mentioned above uses a large amount of time and space resources. The interval-based Time Series Forest Classifier also provides high accuracy (both KNeighbors and Time Series Forest Classifier have a score a 1.000 in the example), but typically operates more efficiently than the other algorithms given in the example. Accordingly, in an embodiment, AI platform 20 may comprise a Time Series Forest Classifier trained with labeled data that was obtained from performing a simulated row-hammer attack.

Figure 7:
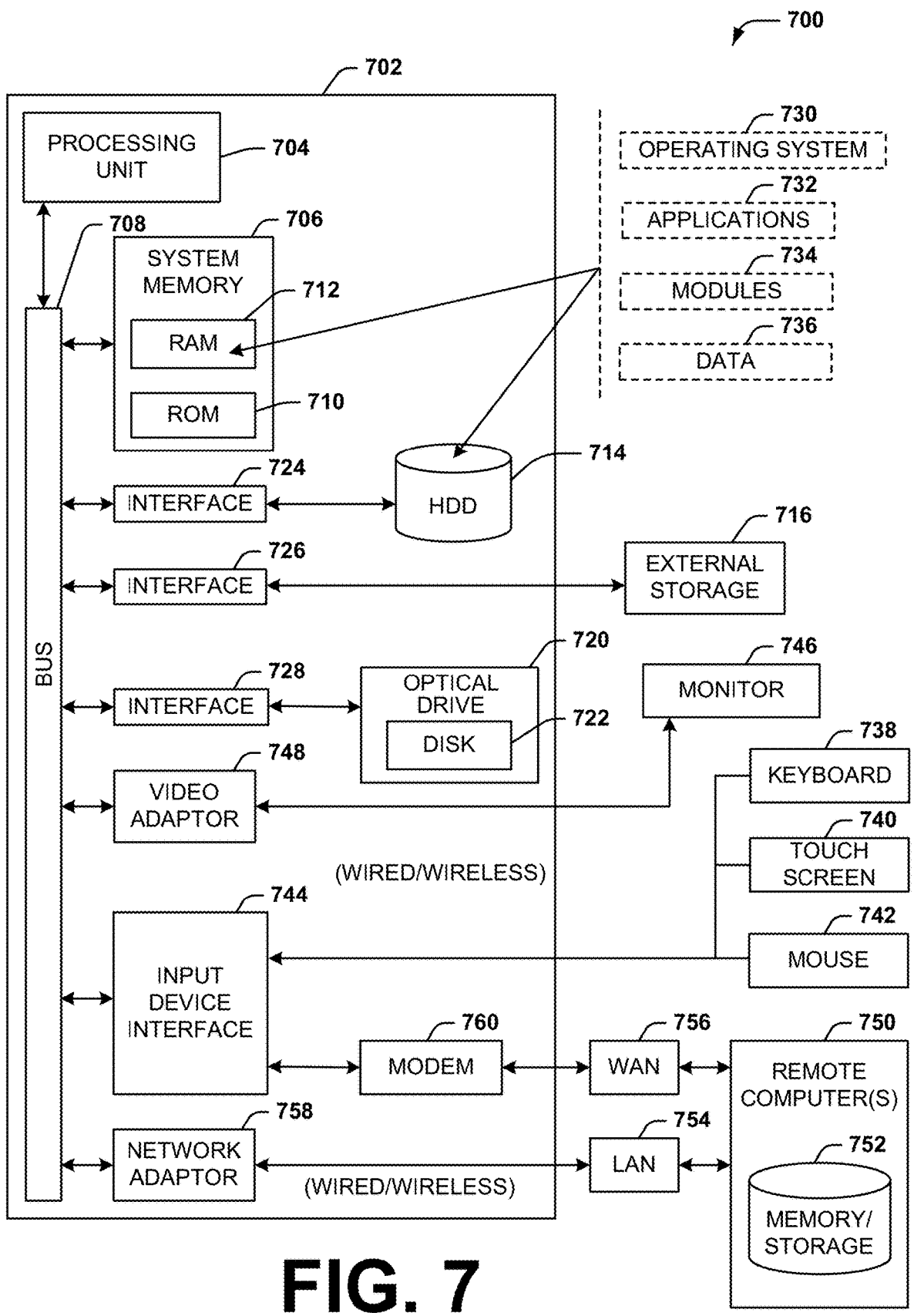
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 660 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
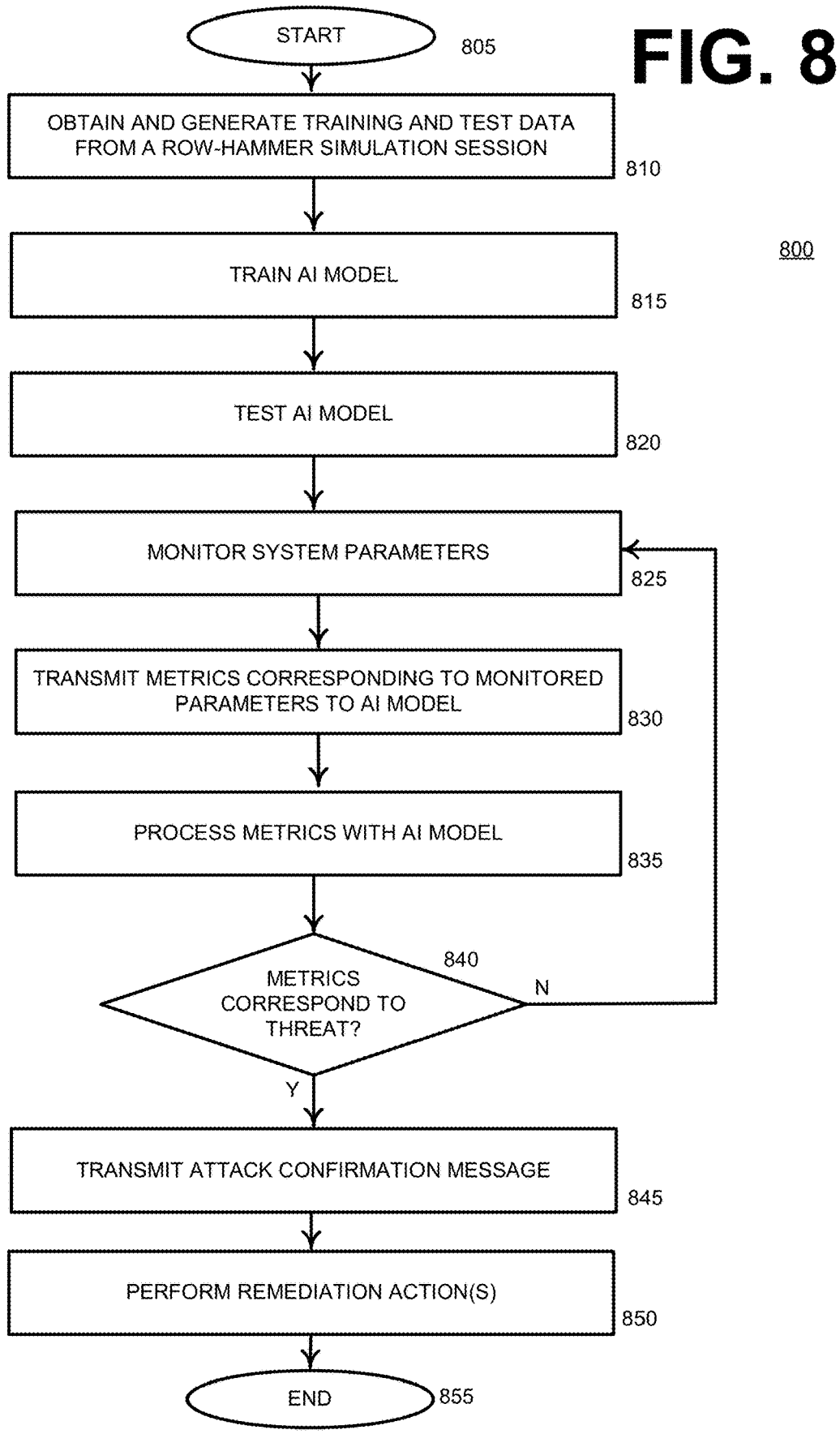
FIG. 8 illustrates a flow diagram of a method to detect and remediate a row-hammer attack.

Turning now to FIG. 8, the figure illustrates a flow diagram of a method 800 to detect a row hammer attack on a memory of a computing device of a computing system. Method 800 begins at step 805. At step 810, computer code intended to simulate a row-hammer attack may be run during a training data generation session on a computing device of computing system. The computing system may be part of an enterprise network. The computing system may be part of a computing system that operates from a networked computing data center. The training data session may result in the generation of a plurality of sets of data, which sets may comprise test data sets and training data sets. During the data generation session, parameters that may be determined to correspond to actions that may occur during a row-hammer attack may be monitored by a data monitoring service in communication with the computing system. The test data sets and training data sets may comprise data monitored periodically. In an embodiment, the test data sets and training data sets may be assembled according to time. The data monitoring service may generate metrics that correspond to the parameters that were monitored during the data generation session. The data sets may be assembled into sets according to an order that they occur with respect to time that the data making up the sets were generated.

After generating the data sets, an AI model, which may comprise a Time Series Classification model, may be trained with one or more of the sets of training data metrics generated at step 810. At step 820 the AI model may be tested using the testing data sets that were also generated at step 810.

After testing has been completed satisfactorily, the AI model begins operating at step 825 on live, real-world data as a computer system being monitored by a data service operates according to its normal intended operation. The data service monitors parameters, such as L2 and L3 cache misses and Instructions per cycle of a CPU of a computing system that is being monitored, and assembles data obtained during operation of the computing system into corresponding metrics, which are transmitted at step 830 via a secure channel to the AI model, which may be operating from a cloud service provided by a cloud services provider. At step 835, metrics received at step 830 are processed by the AI model to determine whether data corresponding to the metrics likely resulted from a row-hammer attack. The processing may occur at a determined rate, such as once every five minutes, for example. Other periods of processing of metrics received at step 830 may be used instead of five minutes. At step 840, if the AI model determines that the metrics processed at step 835 do not correspond to a row-hammer attack, method 800 returns to step 825 and a next set of parameter metrics are generated based on data monitored by the data monitoring service.

If, however, a determination is made at step 840 that the metrics received at step 830 correspond to a row-hammer attack, the AI model, or a cloud services service in communication with the AI model, may generate and then transmit, via the same secure channel used to transmit metrics at step 830, a row-hammer attack confirmation message to the data service at step 845. The row-hammer attack confirmation message may include a notification to the data service that a row-hammer attack likely occurred to a computing system that the data service is monitoring. The row-hammer attack confirmation message may identify a computing system, or a computing device that may have been the subject of a row-hammer attack. The row-hammer attack confirmation message may include one or more instructions for remediation measures to be carried out by the data service, or by a computing system or computing device in response to the attack confirmation message. In an embodiment, the row-hammer attack confirmation message may merely notify the data service that a row-hammer attack likely occurred, and the data service may determine what remediation measures, if any, to implement. At step 850, remediation measures that were either instructed in the row-hammer attack message, or that are determined by a data service in response to the row-hammer attack confirmation message, may be implemented. Remediation measures may be based for examples, on the type of device being attacked, the configuration of the device being attacked, or based on a duration of the attack. Method 800 ends at step 855.

Figure 9:
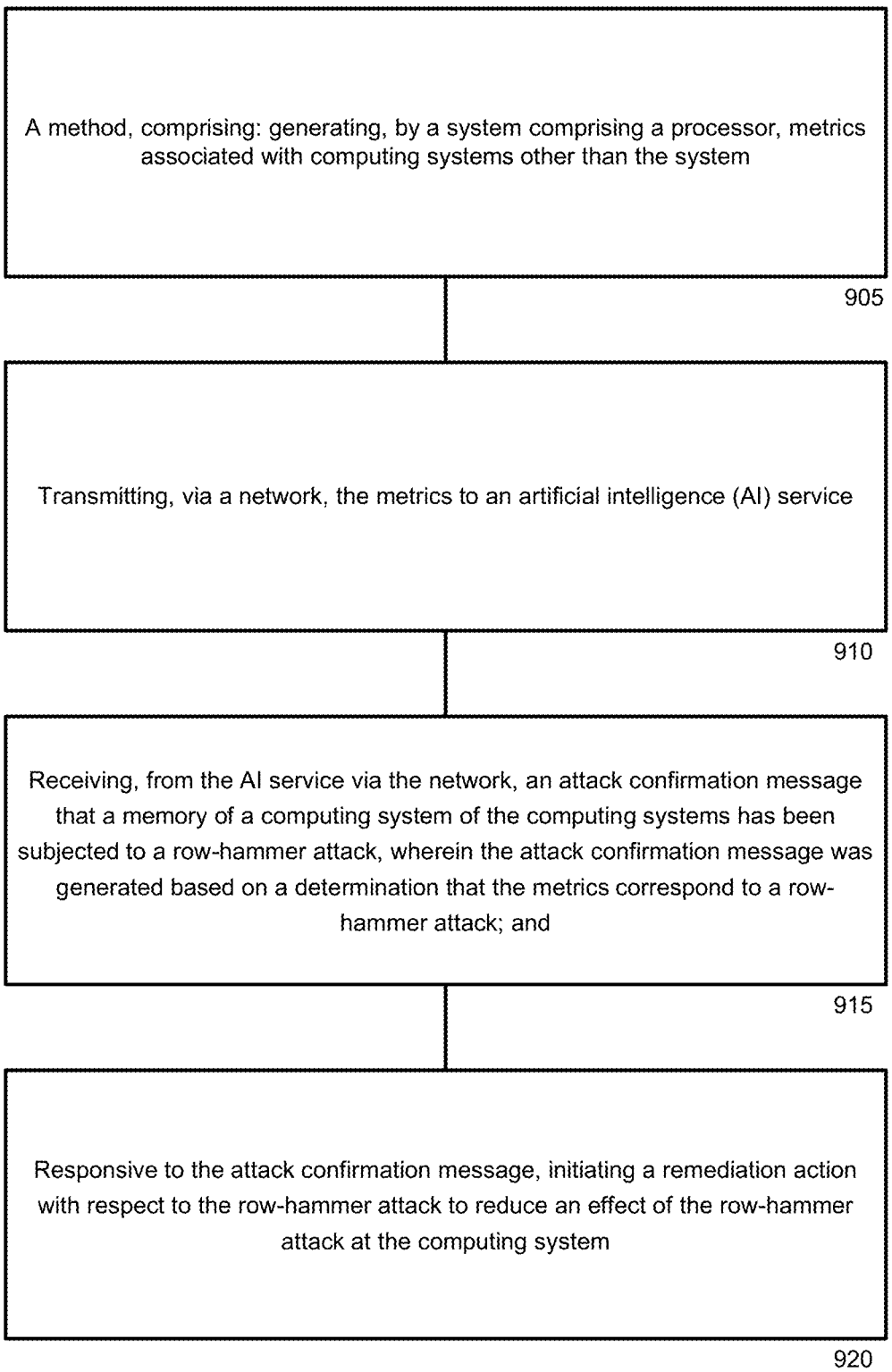
FIG. 9 illustrates a row-hammer attack detection exemplary embodiment method.

Turning now to FIG. 9, the figure illustrates a block diagram of an embodiment method 900. At block 905 the embodiment method, comprises: generating, by a system comprising a processor, metrics associated with computing systems other than the system; at block 910 transmitting, via a network, the metrics to an artificial intelligence (AI) service; at block 915 receiving, from the AI service via the network, an attack confirmation message that a memory of a computing system of the computing systems has been subjected to a row-hammer attack, wherein the attack confirmation message was generated based on a determination that the metrics correspond to a row-hammer attack; and at block 920 responsive to the attack confirmation message, initiating a remediation action with respect to the row-hammer attack to reduce an effect of the row-hammer attack at the computing system.

Figure 10:
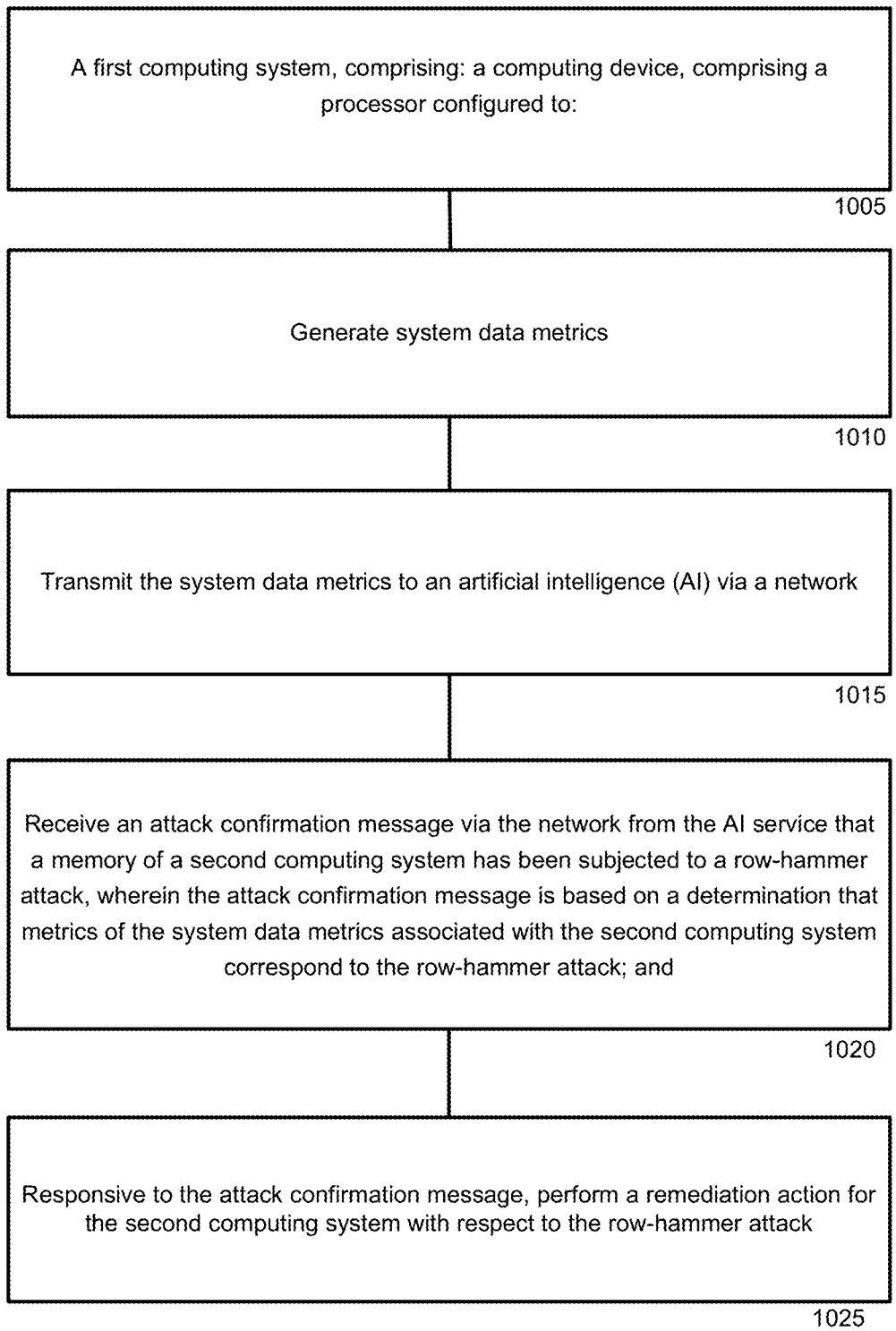
FIG. 10 illustrates a row-hammer attack detection exemplary embodiment system.

Turning now to FIG. 10, the figure illustrates a block diagram of an embodiment system 1000. At block 1005 the embodiment system comprises: A first computing system, comprising: a processor configured to: at block 1010 generate system data metrics; at block 1015 transmit the system data metrics to an artificial intelligence (AI) service via a network; at block 1020 receive an attack confirmation message via the network from the AI service that a memory of a second computing system has been subjected to a row-hammer attack, wherein the attack confirmation message is based on a determination that metrics of the system data metrics associated with the second computing system correspond to the row-hammer attack; and at block 1025 responsive to the attack confirmation message, perform a remediation action for the second computing system with respect to the row-hammer attack.

Figure 11:
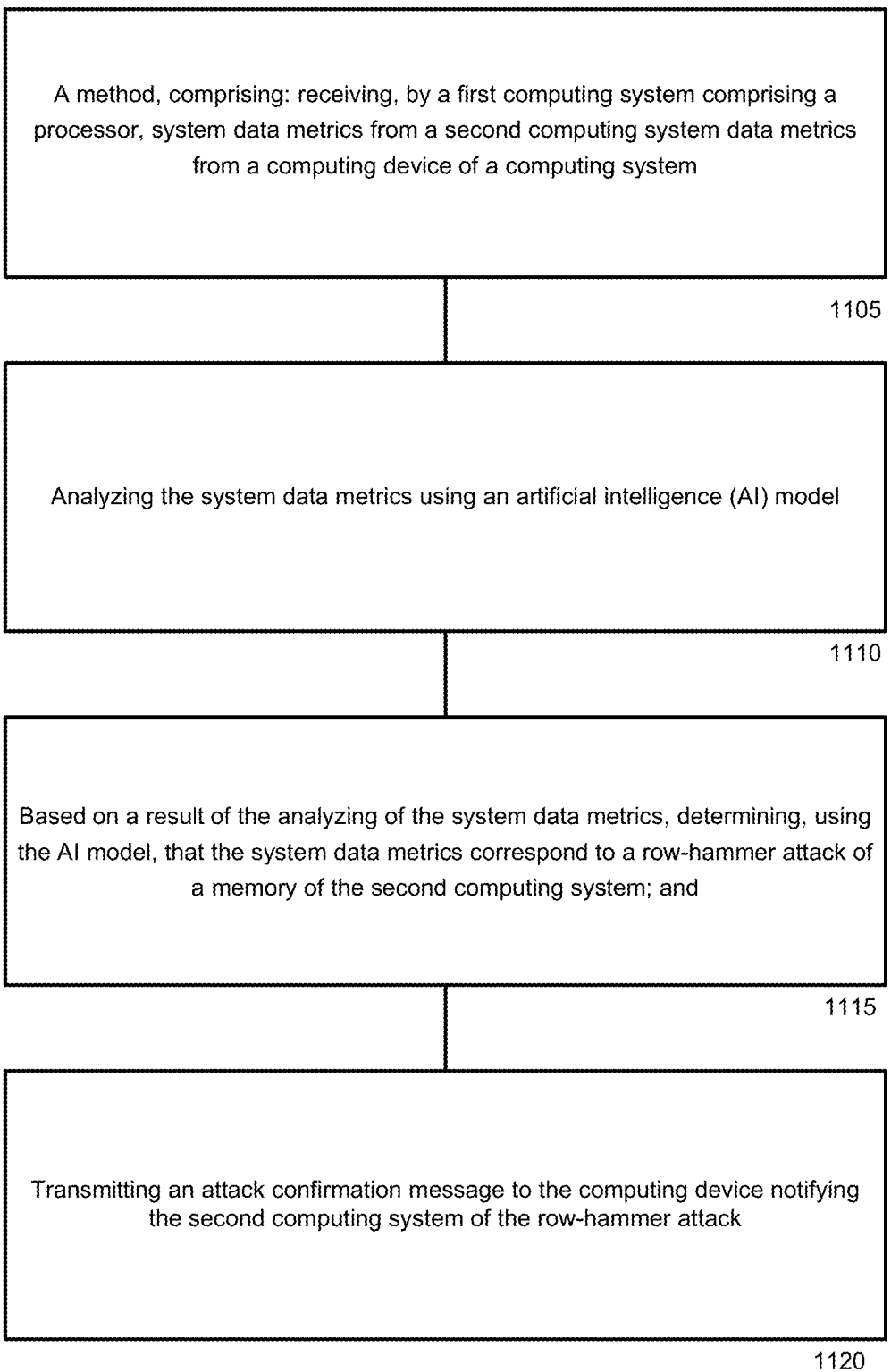
FIG. 11 illustrates a row-hammer attack detection service exemplary embodiment method.

Turning now to FIG. 11, the figure illustrates an embodiment method. At block 1105 the method comprises: receiving, by a first computing system comprising a processor, system data metrics from a second computing system; at block 1110 analyzing the system data metrics using an artificial intelligence (AI) model; at block 1115 based on a result of the analyzing of the system data metrics, determining, using the AI model, that the system data metrics correspond to a row-hammer attack of a memory of the second computing system; and at block 1120 transmitting an attack confirmation message to the computing device notifying the second computing system of the row-hammer attack.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
    generating, by a data services computing system comprising at least one processor, metrics associated with at least one enterprise computing system other than the data services computing system, wherein the data services computing system and the at least one enterprise computing system are distinct computing systems coupled by a network, wherein the at least one enterprise computing system is not part of the data services computing system, and wherein the data services computing system is not part of the at least one enterprise computing system;
    transmitting, by the data services computing system via the network, the metrics to an artificial intelligence (AI) service, wherein the AI service is not part of, and is not executed by, the data services computing system;
    receiving, by the data services computing system from the AI service via the network, an attack confirmation message that a memory of at least one of the at least one enterprise computing system has been subjected to a row-hammer attack, wherein the attack confirmation message was generated based on a determination that the metrics correspond to at least one row-hammer attack characteristic; and
    responsive to the attack confirmation message, initiating, by the data services computing system, a remediation action with respect to the row-hammer attack to reduce at least one effect of the row-hammer attack at the at least one of the at least one enterprise computing system,
    wherein the AI service comprises a time series classification model trained using labeled data that corresponds to, based on previous human prediction data, the at least one row-hammer attack characteristic that is threshold likely to correspond to the at least one effect to a processor or to the memory of the at least one of the at least one enterprise computing system being caused by the row-hammer attack.

2. The method of claim 1, wherein the metrics comprise at least one of a cache-miss count, a processor instruction per cycle count, or a cache flush count.

3. The method of claim 1, wherein the attack confirmation message comprises an instruction to initiate the remediation action.

4. The method of claim 1, wherein the data services computing system determines the remediation action applicable to the initiating of the remediation action.

5. The method of claim 1, wherein the AI service determines that the memory of the at least one enterprise computing system has been subjected to the row-hammer attack based on a type of computing system corresponding to the at least one enterprise computing system.

6. The method of claim 1, wherein the remediation action comprises at least one of: a stopping of data replication to secondary storage of the at least one enterprise r computing system, a disabling of a connection by the at least one enterprise computing system to a host, an enabling of a service mode that allows service account access only by the at least one enterprise computing system, an enabling of a diagnostic service for the at least one enterprise computing system, an enabling of a data collection service for the at least one enterprise computing system, a shutting of down a file system service of the at least one enterprise computing system, a shutting of down a block storage service of the at least one enterprise computing system, a protecting of a management database of the at least one enterprise computing system, or a restricting of management connectivity by the at least one enterprise computing system to a storage platform.

7. The method of claim 1, further comprising transmitting, by the data services computing system to the AI service, a remediation message notifying of a performance of the remediation action.

8. A first computing system, comprising:
    a first hardware processor configured to:
        generate system data metrics, corresponding to a second computing system comprising a second hardware processor, using at least one data service, wherein the first computing system is not part of the second system, and wherein the second computing system is not part of the first computing system;
        transmit the system data metrics to an artificial intelligence (AI) service via a first network;
        receive an attack confirmation message via the first network from the AI service that a memory of the second computing system has been subjected to a row-hammer attack, wherein the attack confirmation message is based on a determination that metrics of the system data metrics associated with the second computing system correspond to the row-hammer attack; and responsive to the attack confirmation message, perform a remediation action for the second computing system with respect to the row-hammer attack that comprises shutting down the at least one data service;

wherein the first computing system and the second computing system are distinct computing systems coupled via a second network.

9. The first computing system of claim 8, wherein the system data metrics comprise at least one of a cache-miss count or a central processing unit instruction per cycle count.

10. The first computing system of claim 8, wherein the first processor of the first computing system is further configured to determine the remediation action.

11. The first computing system of claim 8, wherein the attack confirmation message comprises an instruction to perform the remediation action.

12. The first computing system of claim 8, wherein the remediation action comprises at least one of: stop data replication to secondary storage, disable connection to a host, enable a service mode that allows service account access only, enable a diagnostic service, enable a data collection service, shut down a file system service, shut down a block storage service, protect a management database, or restrict management connectivity to a storage platform.

13. A method, comprising:
receiving, by a first computing system comprising at least one processor from a data service computing system, system data metrics corresponding to a second computing system, wherein the data service computing system, the first computing system, and the second computing system are distinct computing systems coupled via a network, and wherein each of the first computing system, the second computing system, and the data services computing system is not part of either of respective other computing systems;
analyzing, by the first computing system, the system data metrics using an artificial intelligence (AI) model;
based on a result of the analyzing of the system data metrics, determining, by the first computing system using the AI model, that the system data metrics correspond to a row-hammer attack of a memory of the second computing system; and
transmitting, by the first computing system to the data service computing system, an attack confirmation message indicative of the row-hammer attack.

14. The method of claim 13, wherein the AI model is a time series classification model.

15. The method of claim 13, wherein the system data metrics comprise at least one of a cache-miss count, a processor instruction per cycle count, a co-processor instruction per cycle count, or a cache flush count.

16. The method of claim 13, wherein the AI model is trained with labeled data corresponding to at least some of the system data metrics.

17. The method of claim 13, wherein the AI model is implemented in a cloud-based platform that communicates with the second computing system via a secure remote support-based secure channel.

18. The method of claim 13, further comprising:
computing, by the first computing system, at least one risk-level metric based on the determining that that the system data metrics correspond to the row-hammer attack; and
sending, by the first computing system, the at least one risk-level metric to a user interface to be rendered via the user interface.

19. The method of claim 1, wherein the at least one effect comprises at least one of: at least one voltage or at least one digital state corresponding to at least one cell of at least one row of the memory of the at least one enterprise computing system.

20. The method of claim 19, wherein the AI service is trained using data that results from at least one simulated row-hammer attack that simulates row-hammer activity with or without input/output loading with respect to storage equipment or memory corresponding to the at least one enterprise computing system.

* * * * *